(12) United States Patent
Pandey et al.

(10) Patent No.: US 11,829,697 B2
(45) Date of Patent: Nov. 28, 2023

(54) REGION-BASED LAYOUT ROUTING

(71) Applicant: INTERNATIONAL BUSINESS MACHINES CORPORATION, Armonk, NY (US)

(72) Inventors: Diwesh Pandey, Bangalore (IN); Gustavo Enrique Tellez, Hyde Park, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 257 days.

(21) Appl. No.: 17/395,951

(22) Filed: Aug. 6, 2021

(65) Prior Publication Data
US 2023/0038321 A1 Feb. 9, 2023

(51) Int. Cl.
*G06F 30/394* (2020.01)
*G06F 30/392* (2020.01)
*G06F 119/18* (2020.01)

(52) U.S. Cl.
CPC .......... *G06F 30/394* (2020.01); *G06F 30/392* (2020.01); *G06F 2119/18* (2020.01)

(58) Field of Classification Search
USPC ....................................................... 716/119
See application file for complete search history.

(56) References Cited

U.S. PATENT DOCUMENTS

| 10,192,018 | B1 | 1/2019 | Gerousis et al. |
| 10,831,972 | B2 | 11/2020 | Pandey et al. |
| 2006/0092162 | A1* | 5/2006 | Deering ............... G06T 1/20 345/506 |
| 2009/0037851 | A1 | 2/2009 | Gray et al. |
| 2009/0217228 | A1* | 8/2009 | Melzner ............... G06F 30/394 716/122 |
| 2010/0205572 | A1* | 8/2010 | Dai .................... G06F 30/23 716/120 |
| 2015/0248514 | A1 | 9/2015 | Salodkar et al. |

(Continued)

FOREIGN PATENT DOCUMENTS

| CN | 101093519 A | 12/2007 |
| CN | 105320798 A | 2/2016 |

(Continued)

OTHER PUBLICATIONS

International Search Report issued in corresponding PCT Application Serial No. PCT/CN2022/107769 dated Sep. 28, 2022, pp. 1-5.

(Continued)

*Primary Examiner* — Mohammed Alam
(74) *Attorney, Agent, or Firm* — Tutunjian & Bitetto, P.C.; Erik Johnson

(57) ABSTRACT

Methods and systems of routing a design layout include setting an inner region and an outer region for modification of structures in an original design layout, in accordance with a minimum spacing that is based on a fabrication process. Routing of trim positions and conductive wire extents is performed within the inner region, based on positions of shapes within the outer region, including node folding of a new constraint graph to minimize perturbations from a previous constraint graph, to generate an updated design layout that can be manufactured using the fabrication process.

18 Claims, 8 Drawing Sheets

(56) References Cited

U.S. PATENT DOCUMENTS

| | | | |
|---|---|---|---|
| 2020/0104449 A1 | 4/2020 | Pandey et al. | |
| 2023/0008569 A1* | 1/2023 | Pandey | G06F 30/392 |
| 2023/0038321 A1* | 2/2023 | Pandey | G06F 30/392 |

FOREIGN PATENT DOCUMENTS

| | | |
|---|---|---|
| CN | 105893645 B | 8/2016 |
| CN | 110998828 A | 4/2020 |
| CN | 111950225 A | 11/2020 |

OTHER PUBLICATIONS

Mell et al., "The NIST Definition of Cloud Computing", National Institute of Standards and Technology, Special Publication 800-145. Sep. 2011, pp. 1-7.

Tang, Hao, et al. "A Survey on Steiner Tree Construction and Global Routing for VLSI Design", IEEE Access. Apr. 22, 2020, 2020, pp. 68593-68622.

Fang, Shao-Yun, et al. "Cut Mask Optimization with Wire Planning in Self-Aligned Multiple Patterning Full-Chip Routing", IEEE Journals and Magazine, IEEE Xplore. Sep. 7, 2016, pp. 581-593.

\* cited by examiner

REGION-BASED LAYOUT ROUTING

BACKGROUND

The present invention generally relates to design layout routing, and, more particularly, to region-based techniques for routing in extreme ultraviolet and self-aligned double patterning fabrication technology.

When designing an integrated chip, various layout considerations are taken into account to ensure that the design is manufacturable. Layout routing may be performed automatically, but routing large chip designs can be computationally expensive.

SUMMARY

A method of routing a design layout includes setting an inner region and an outer region for modification of structures in an original design layout, in accordance with a minimum spacing that is based on a fabrication process. Routing of trim positions and conductive wire extents is performed within the inner region, based on positions of shapes within the outer region, including node folding of a new constraint graph to minimize perturbations from a previous constraint graph, to generate an updated design layout that can be manufactured using the fabrication process.

A system for routing a design layout includes hardware processor and a memory, that stores an original design layout and a computer program product. When executed by the hardware processor, the computer program product causes the hardware processor to set an inner region and an outer region for modification of structures in the original design layout, in accordance with a minimum spacing that is based on a fabrication process, and to perform routing of trim positions and conductive wire extents within the inner region, using a hardware processor, based on positions of shapes within the outer region, including node folding of a new constraint graph to minimize perturbations from a previous constraint graph, to generate an updated design layout that can be manufactured using the fabrication process.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Certain fabrication technologies, such as extreme ultraviolet (EUV) and self-aligned double patenting (SADP) fabrication processes, produce better yields when particular layout design rules are followed. For example, EUV fabrication has rules regarding the distances between the ends of neighboring conductive lines, such that it may be beneficial to add additional length to a conductive line. SADP, meanwhile, has rules regarding the positioning of trim structures, and it may be beneficial to move such structures and to extend conductive lines to touch them. An automatic layout tool can perform this process automatically, based on an original layout, to generate an output layout that will produce a higher yield of functional devices than the original layout would.

However, as the size of the layout increases, so too does the number of structures that may be considered. While finding an optimal layout may consider the positions of every structure against every other structure, such a process may be computationally burdensome. To reduce the computational effort needed to perform routing in such cases, the number of structures in consideration may be limited according to particular regions of the layout. Perturbations in a routed design layout may also be minimized, to reduce the need to recompute layouts.

Figure 1:
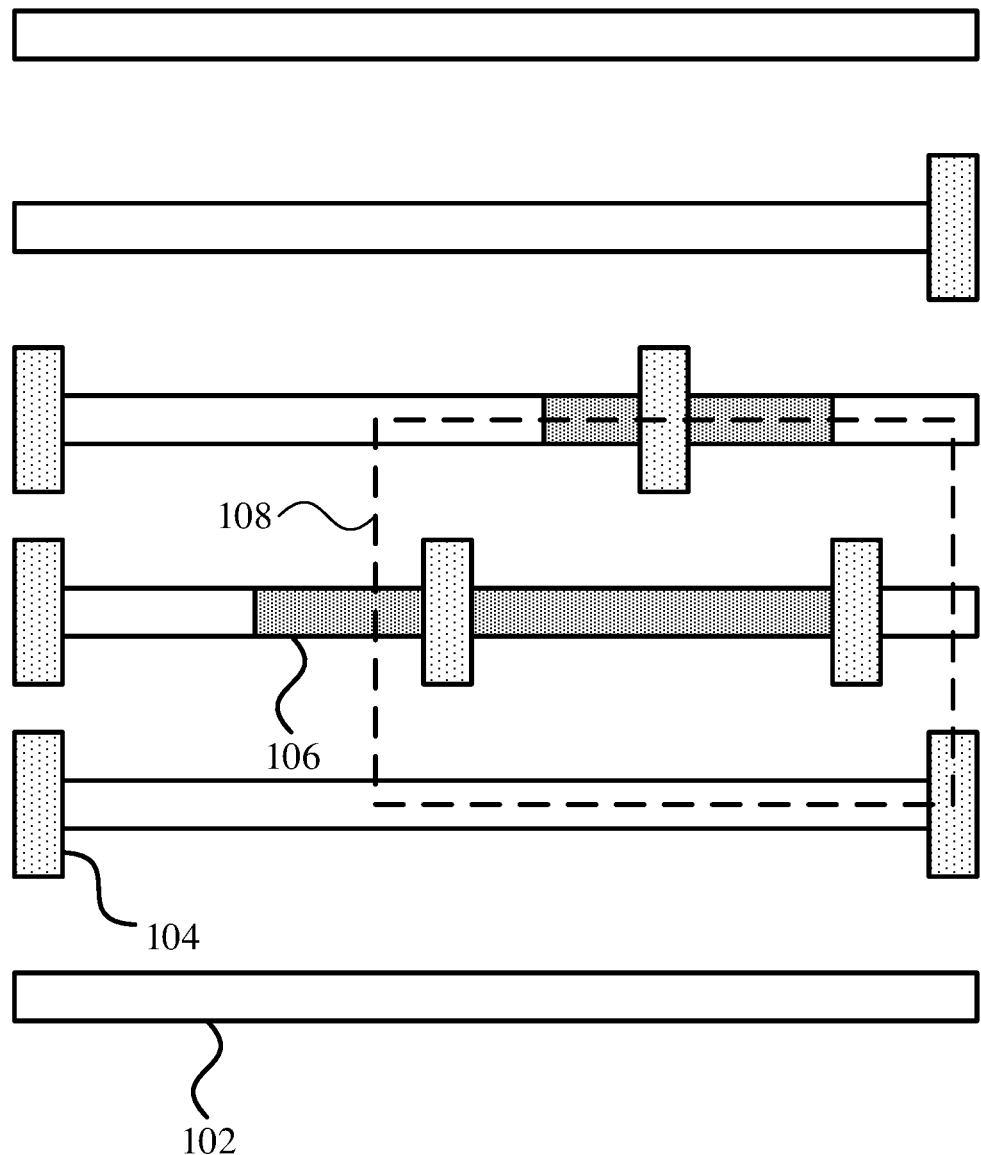
FIG. 1 is a view of a chip design layout that includes actual structures as well as metal extents and trims that have been inserted as part of an optimization, in accordance with an embodiment of the present invention.

Referring now to FIG. 1, an exemplary design layout is shown. The layout includes a set of conductive lines 102, for example representing locations where a conductive material will be placed. These lines 102 may be separated by trims 104, for example representing locations where an electrically insulating material may be placed. During routing, the length of the conductive lines 102 may be extended by extents 106, representing additional conductive material that is automatically added to the layout by the routing tool. Routing may be an iterative process, and so a previously routed layout may be considered again to see if improvements may be made.

During routing, consideration may be limited to the structures within a region 108. Routing may be an iterative process, with routing being performed in sequential regions until the entire design has been routed. Routing may furthermore be repeated in regions that have already been routed, to take into account changes that have been made in neighboring regions. This process may be repeated until any appropriate convergence criteria are reached.

The selection of this region, and the structures to be considered within it, is based on an original input region. As will be described in greater detail below, the layout features nearby the input region may be taken into account to determine where the ultimate region 108 will be set.

Figure 2:
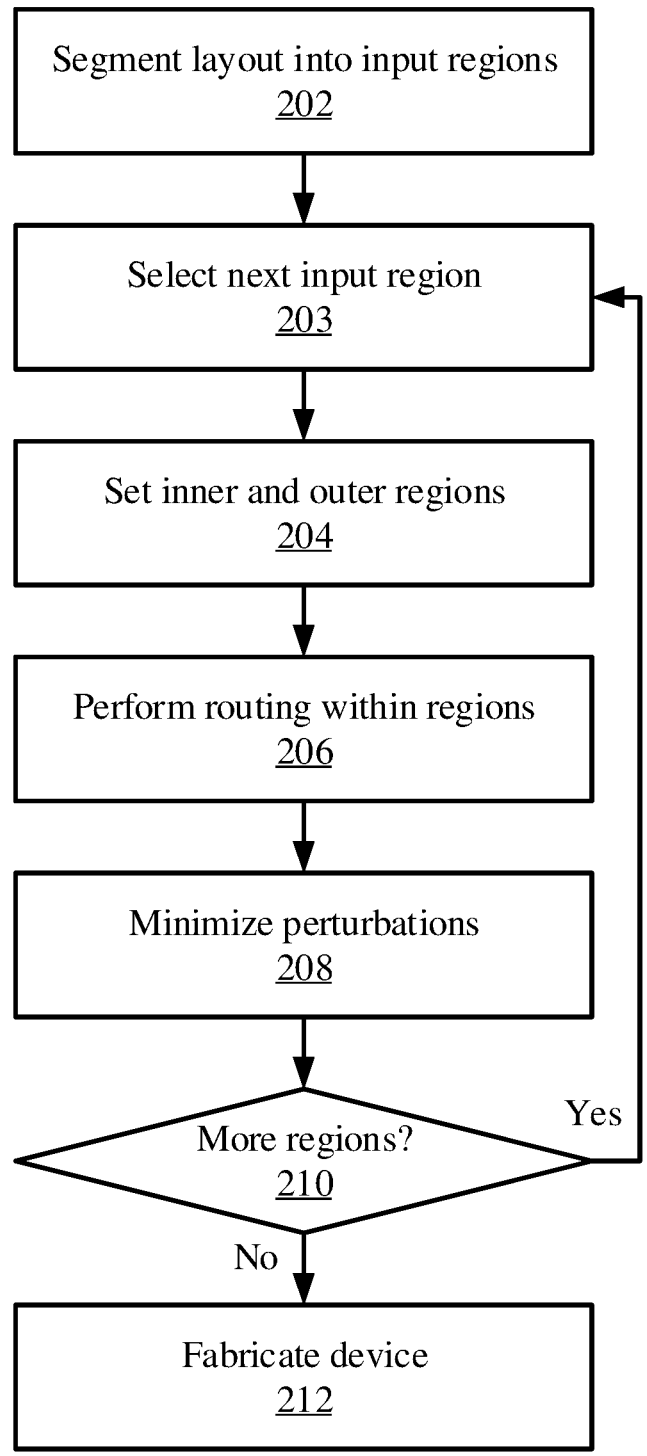
FIG. 2 is a block/flow diagram of a method for performing routing within a chip design layout, including setting regions based on a fabrication technology, in accordance with an embodiment of the present invention.

Referring now to FIG. 2, a method of layout routing is shown. Block 202 segments the layout into input regions. Any appropriate segmentation scheme may be used, for example selecting an appropriate tile size and simply dividing the layout into tiles according to the tile size. For example, input data could include a net, with a region being created as a bounding box of the net. A region may also be created while rerouting some portion of the net, which may include relatively few metal shapes. A region for the portion may then be determined as a box enclosing those metal shapes. Block 203 selects an input region.

As will be described in greater detail below, block 204 uses the selected input region to identify inner and outer regions, based on the design features near and within the input region. The outer region determines which features will be considered, and the inner region determines an area where changes may be made to the design layout. Block 206 performs routing within the inner and outer regions, for example limiting consideration to those elements within the outer region, and limiting changes to within the inner region. For example, this routing may include EUV- and SADP-type routing, by positioning trims 104 and extents 106, but it should be understood that any appropriate routing may be performed. As will be described in greater detail below, the routing process may be parallelized across multiple processors or processor cores, such that block 206 may be performed for multiple different regions at once.

Block 208 optionally minimizes perturbations caused by the routing. As will be described in greater detail below, a design layout may already have trims and extents largely optimized, for example in the case of engineering change order (ECO) routing. Block 208 seeks to retain the optimized wires while still producing determining line end solutions.

Block 210 then determines whether there are more input regions to consider. If so, processing returns to block 203 and a next input region is selected. If not, then the optimized design layout is output, and block 212 can use the optimized design layout to fabricate the device. Additional optimization steps may be performed as well, before the device is fabricated, such as in ECO routing. Fabrication may include any appropriate manufacturing process or processes, such as EUV photolithography and/or SADP fabrication.

Figure 3:
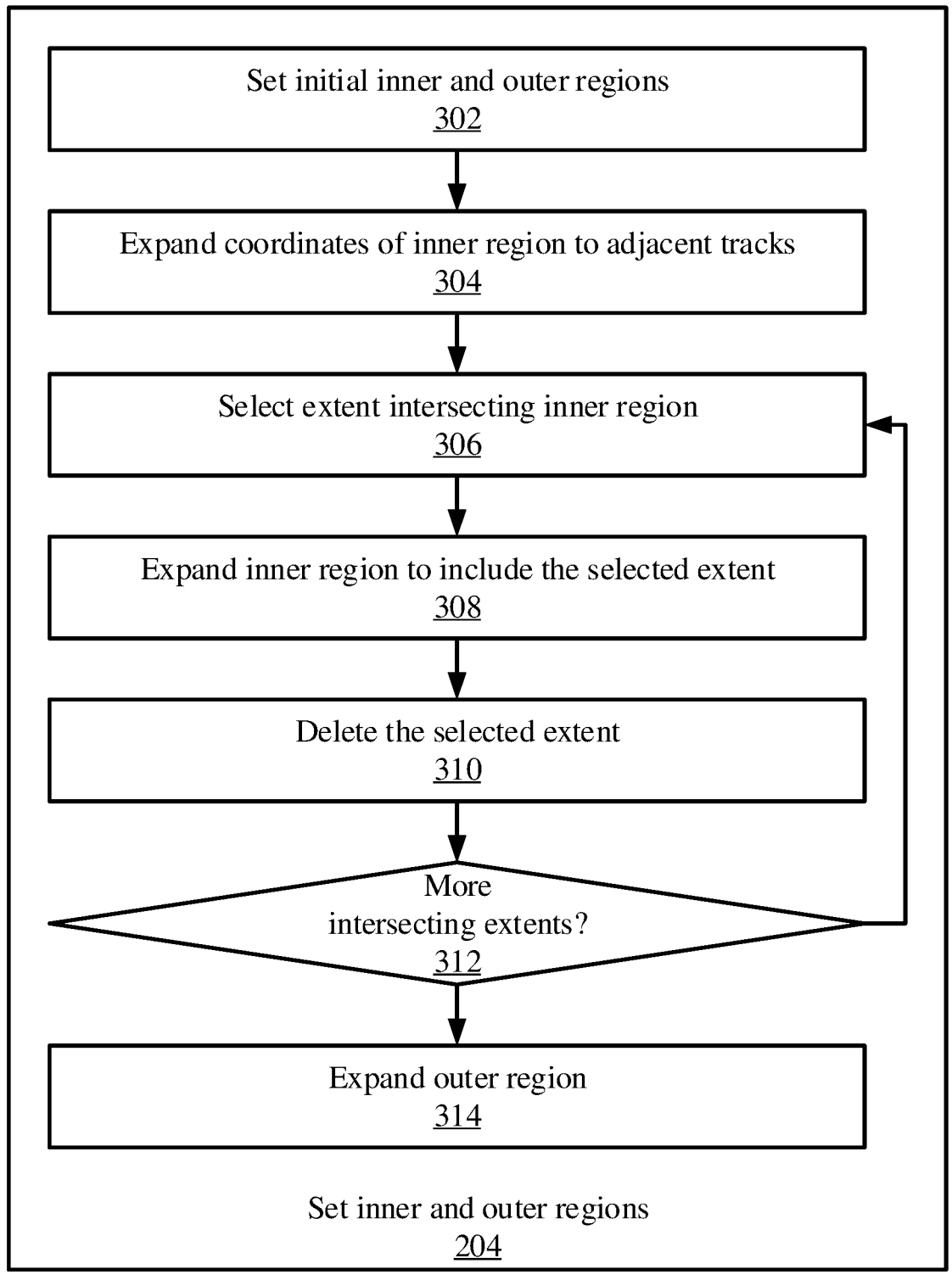
FIG. 3 is a block/flow diagram of a method for setting regions to promote efficiency in performing routing for a chip design layout, in accordance with an embodiment of the present invention.

Referring now to FIG. 3, additional detail on the selection of inner and outer regions from block 204 is shown. Block 302 initializes the inner and outer regions to match the input region selected in block 203. The layout is described herein as having conductive lines 102 that run horizontally, with 'x' representing the horizontal axis and 'y' representing the vertical axis, but it should be understood that any appropriate frame of reference may be used instead. The coordinates of the input region (and, thus, the initial coordinates of the inner region and outer region) may be expressed as $x_{lo}$, $x_{hi}$, $y_{lo}$, $y_{hi}$, indicating the upper and lower x and y of the region. Each structure, such as the extents 106, may similarly have $x_{lo}$, $x_{hi}$, $y_{lo}$, and $y_{hi}$ values.

Block 304 expands the coordinates of the inner region and the outer region by the minimum track spacing, moving the $y_{lo}$ and $y_{hi}$ boundaries to reach the next closest conductive lines 102. If the inner region intersects with any metal shape, the inner region may be expanded in the horizontal coordinates $x_{lo}$ and $x_{hi}$ so that it completely covers the existing metal with some margin min_trim_spacing.

Block 306 selects an extent 106 that intersects with the inner region, which may include extents 106 that partially or completely fall within the inner region. Block 308 then expands the inner region to include the selected extent. Block 308 may, for example, set a minimum trim spacing to be the larger of the minimum same-track spacing for the track that includes the selected extent and the minimum trim spacing across different tracks. The value of $x_{lo}$ for the inner region may then be set to the lesser of the current value of $x_{lo}$ for the inner region and an $x_{lo}$ value of the selected extent, minus the minimum trim spacing. The value of $x_{hi}$ for the inner region may similarly be set to the greater of the current value of $x_{hi}$ for the inner region and an $x_{hi}$ value of the selected extent, plus the minimum trim spacing. This expands the inner region to include the entirety of any such extent, with some additional space to account for the minimum trim spacing.

Block 310 then deletes the selected extent. This removes preexisting routing structures within the inner region, so that the new routing can be performed. Block 312 determines whether there are more events within the inner region. If so, block 306 selects a next extent 106. If not, block 314 expands the outer region according to the latest values of the inner region, plus the minimum trim spacing on the x axis, min_trim_spacing, and a minimum different track spacing on the y axis, min_difftrack_spacing. Notably, the minimum trim spacing may depend on rules for each particular fabrication technology, such that the minimum trim spacing will be set in accordance with the needs of the fabrication process. In EUV fabrication technologies, min_trim_spacing may be the minimum line-end distance. In SADP fabrication technologies, the min_trim_spacing may be the minimum trim distance. The value of min_trim_spacing may depend on the width of metal wires and the layer in question, with exemplary values being between about 20 nm and about 500 nm.

The outer region starts with the dimensions of the inner region and is expanded in the horizontal directions ($x_{lo}$ and $x_{hi}$) based on track spacing rules, multiplied by a pruning factor pf. The expansion in the vertical directions may be based on adjacent track spacing rules. The expansion of the outer region may be expressed according to the following equations:

$$\text{outer\_region}.x_{lo} = \min(\text{inner\_region}.x_{lo}, \text{inner\_region}.x_{lo} - \text{pf} \cdot \text{min\_trim\_spacing})$$

$$\text{outer\_region}.x_{hi} = \max(\text{inner\_region}.x_{hi}, \text{inner\_region}.x_{hi} + \text{pf} \cdot \text{min\_trim\_spacing})$$

$$\text{outer\_region}.y_{lo} = \min(\text{inner\_region}.y_{lo}, \text{inner\_region}.x_{lo} - \text{pf} \cdot \text{min\_difftrack\_spacing})$$

$$\text{outer\_region}.y_{hi} = \max(\text{inner\_region}.y_{hi}, \text{inner\_region}.y_{hi} - \text{pf} \cdot \text{min\_difftrack\_spacing})$$

During the routing of block 206, all shapes (e.g., wires 102 and trims 104) within the outer region are identified, and corresponding sweepline events may be executed. Sweepline detects metal shapes in a region and determines a corresponding graph, with the metal shapes being represented as events. Different metal shapes, such wires and vias, are represented by distinct sweepline events. The events are executed to construct nodes in the graph. Metal end positions may be represented as nodes in the graph, and the relationships between metal structures are represented by edges in the graph.

Block 206 may then determine a constraint graph using these shapes, and nodes of the graph within the inner and outer regions may be converted into fixed nodes. Block 206 creates new trims 104 within the inner region in accordance with the routing, and creates new extents 106 that reach from an existing conductive line 102 to contact respective trims 104. During this routing process for a particular input region, block 206 does not create trim shapes 104 outside the inner region, nor moves trims 104 outside of the inner region.

Figure 4:
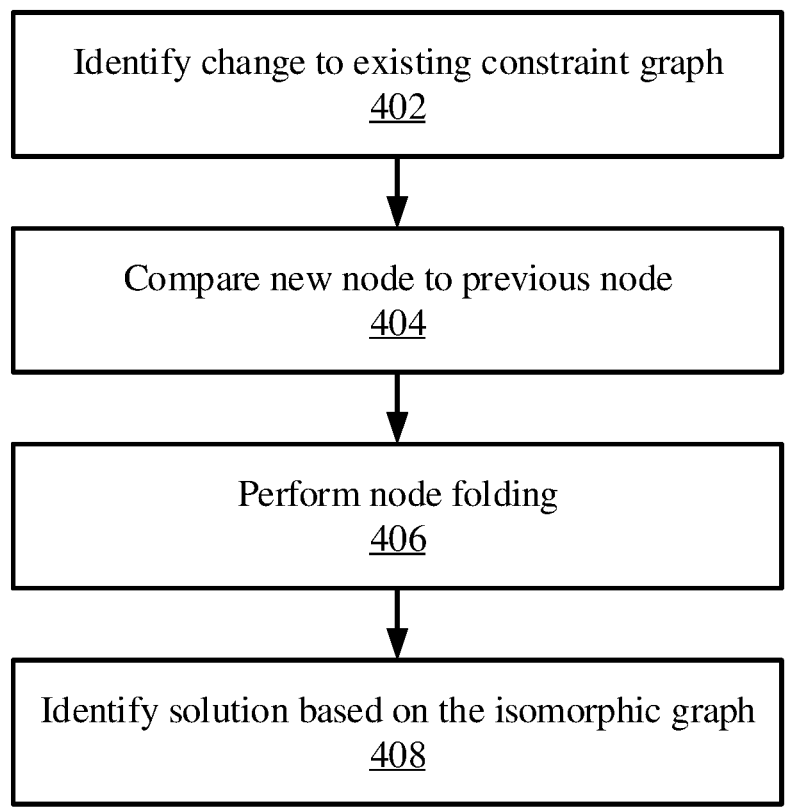
FIG. 4 is a block/flow diagram of a method of promoting efficiency during chip design layout optimization using node folding, in accordance with an embodiment of the present invention.

Referring now to FIG. 4, a method of minimizing perturbations to existing routing is shown. This optimization may be performed in regions, for example as set above, or across the entire design layout. For example, if a design has already been routing, but some ECO has been provided, new routing may need to be performed. The design layout may already have optimized trims 104 and extents 106. These optimized shapes may be retained for the ECO, while still producing deterministic line end solutions. This is possible when an isomorphic graph can be created for two different design views, where the views include a pre-routed design with line end solutions and an ECO-routed design. The graphs created for these two designs will be isomorphic to one another when LB≤pos(current)≤UB and where [LB, UB](prerouted)= [LB, UB](ECO), where LB represents a lower bound of a node before line-end optimization, UB represents an upper bound of the node before line-end optimization, and where [LB, UB] indicates a line segment between these two boundaries, before (prerouted) and after (ECO) routing. If these rules are met, then the optimization space will be identical.

The graphs before-routing and post-routing graphs can be made isomorphic using node folding and unfolding. Whenever a change in the shape is detected, a cloned node may be created which folds to the original node. After graph folding, the existing extents are saved to memory. After routing, the nodes are unfolded, and the solution may be read from memory.

Thus, block 402 identifies a change to an existing constraint graph, for example due to ECO routing that changes a particular extent 106. The post-routing constraint graph may change the location of one node (e.g., the end point of the extent 106) relative to the location of an equivalent node in the original graph, as determined by block 404.

Block 406 performs node folding. Node folding may be performed by using extent metal structures. Because the metal end positions can be moved in the empty space of a gap while performing optimization, when they take their final position, extent metals may be formed to connect from actual metal shapes. This extent metal can be interpreted as a folded metal shape, which can collapse for the purpose of layout optimization. During incremental changes, or iterative optimization, the node can still move within the same gap, so the lower bound and upper bound positions remain the same. These positions will be determined by the actual metal shapes, not by the ends of the extent metal shapes that are found in the first optimization.

Using the node-folded constraint graph, a corresponding isomorphic graph can be used. For example, a solution that was previously computed for the original graph can be re-used for the new constraint graph in block 408. For example, during iterative optimization, the graph can be used from one optimization to the next, or for changes due to ECO optimization or rip-up rerouting of wires.

Figure 5:
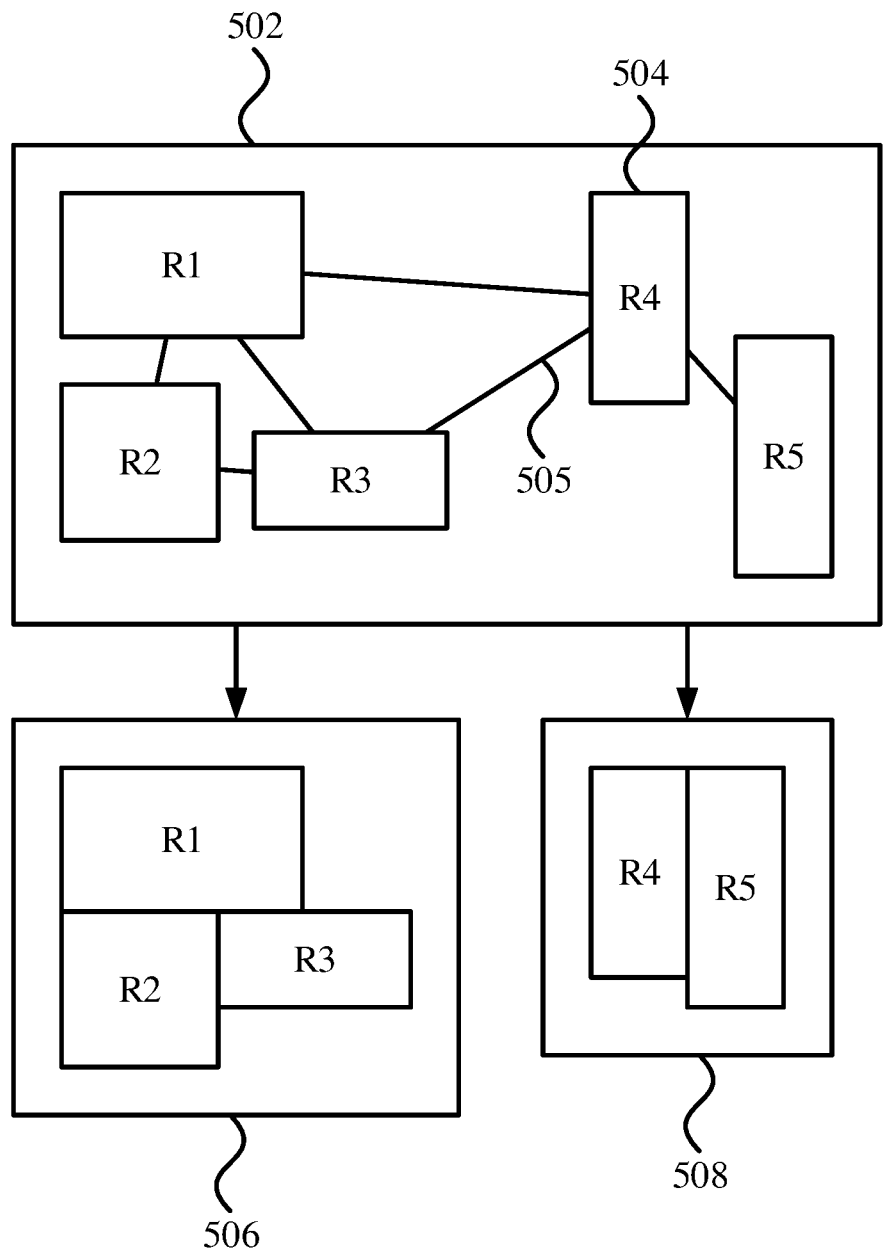
FIG. 5 is a diagram of grouping regions of a chip design layout for parallel processing, in accordance with an embodiment of the present invention.

Referring now to FIG. 5, additional detail is shown on how the performance of ECO routing may be improved. In a system with parallel processing capabilities, such as with multiple processors or processor cores, different regions of a design layout may be optimized in parallel. Using a reach distance parameter, regions that are nearby to one another may be grouped and processed together in a respective thread, with the reach distance parameter being tuned to provide a number of groups that corresponds to a number of available threads. Thus, for example, for higher numbers of available threads, the reach distance parameter made be relatively small, resulting in a larger number of groups. On the other hand, a relatively small number of available threads may have a correspondingly large reach distance parameter, resulting in a lower number of groups.

For example, in a design layout 502, there may be several distinct regions 504 that are to be routed. These regions 504 are characterized by their distances 505 from one another. The regions 504 may be split into a first group 506 and a second group 508, with the members of each respective group being closer to one another than to members of the other group. In a system with a greater number of threads, the threshold reach distance parameter may be decreased, which could result in each region being processed separately, by a separate thread.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Figure 6:
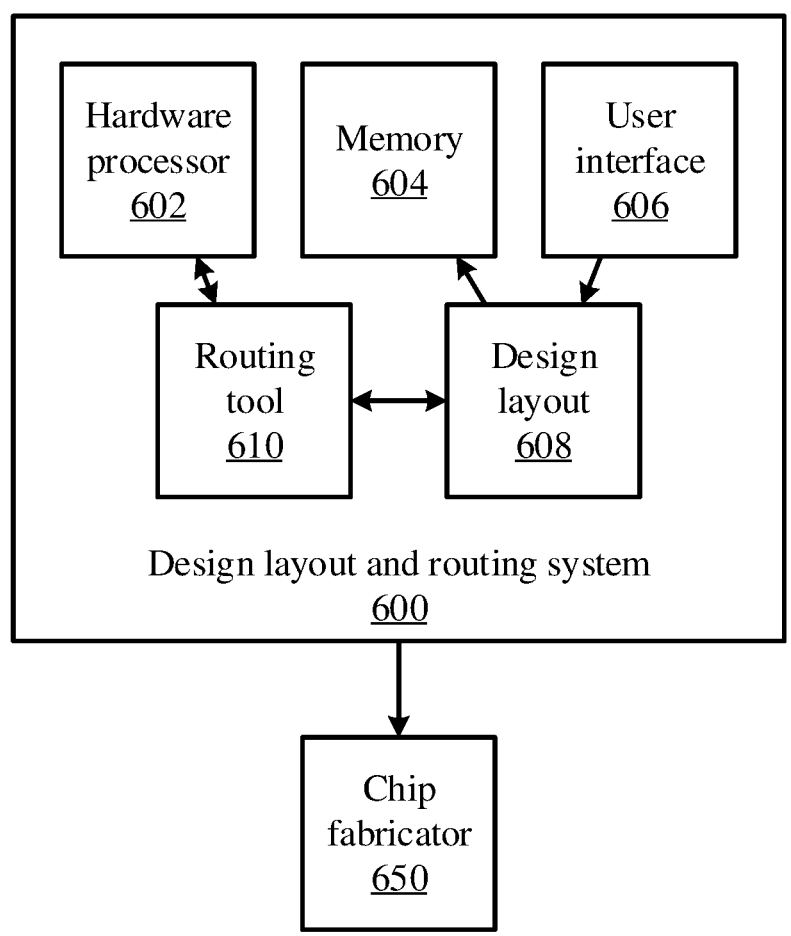
FIG. 6 is a block diagram of a design and layout routing system that can efficiently perform routing within a chip design layout, including regions that are set based on a fabrication technology, in accordance with an embodiment of the present invention.

Referring now to FIG. 6, a design layout and routing system 600 is shown. The system 600 includes one or more hardware processors 602 and a memory 604. The system 600 may further include one or more functional components, which may be implemented as software that is stored in the memory 604 and that is executed by the hardware processor(s) 602.

A user interface 606 provides an interface creating and modifying a design layout 608, which may be stored in the memory 604. A routing tool 610 automatically modifies the design layout 608 in accordance with one or more design rules, for example influenced by the limitations of the physical manufacturing processes that will be used. After initial routing is performed on the design layout, for example including the placement of trims 104 and extents 106, the user may make further changes, such as in an ECO.

During routing, rather than considering the influence of every structure on every other structure on the layout, the routing tool may identify regions of the design layout, and may perform routing within those regions. In this matter, routing may be performed and revised in an efficient manner. The speed of routing may further be increased by dividing the regions of the design layout 608 into groups in accordance with a number of available threads of the hardware processor(s) 602.

The final design layout 608, after routing has verified that the layout 608 complies with design rules, may be sent to a chip fabricator 650. The chip fabricator 650 generally includes a large number of separate fabrication devices and processes that are performed to create an integrated chip or semiconductor device in accordance with the design layout.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
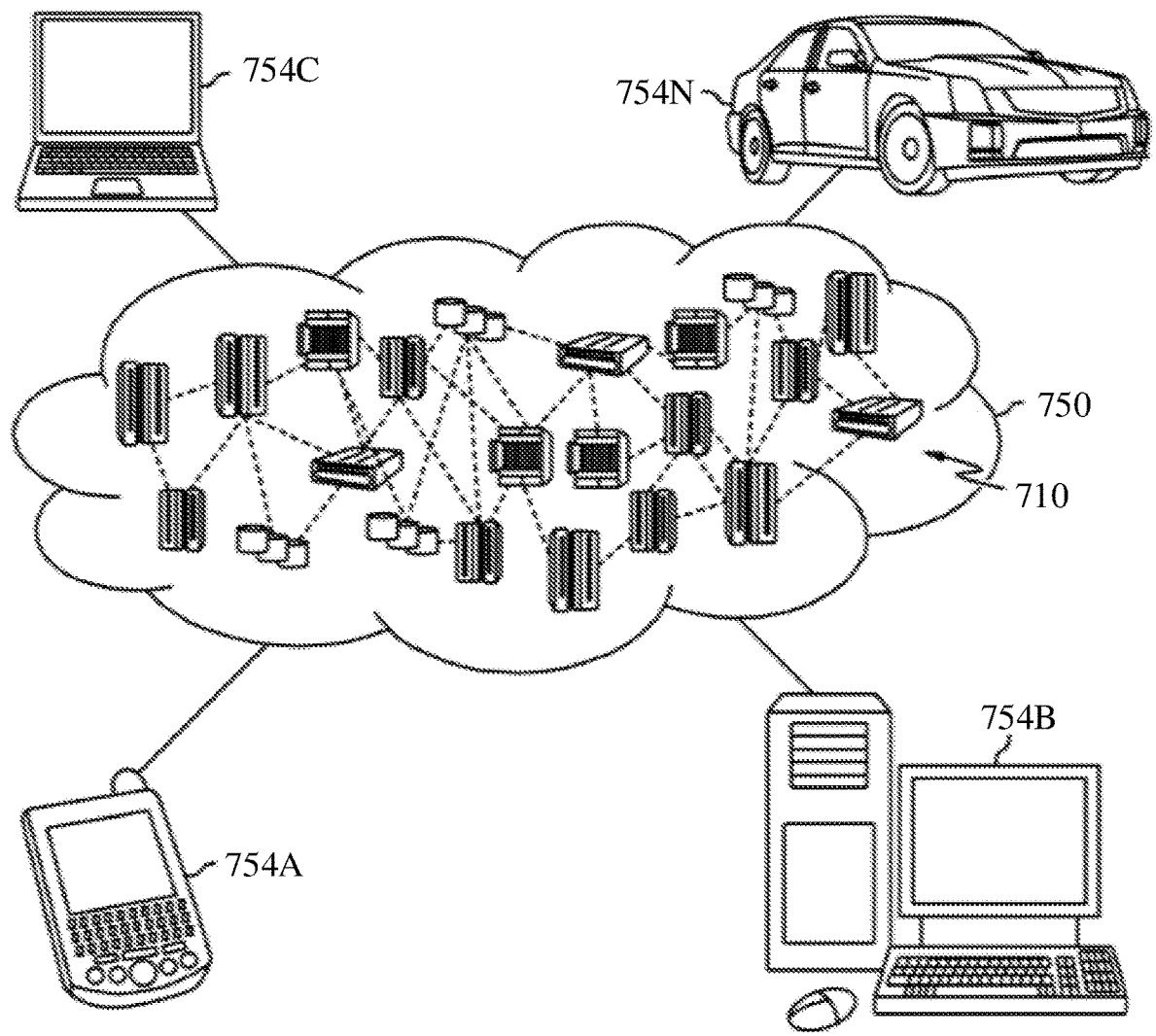
FIG. 7 is a block diagram showing an illustrative cloud computing environment having one or more cloud computing nodes with which local computing devices used by cloud consumers communicate in accordance with one embodiment.

Referring now to FIG. 1, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
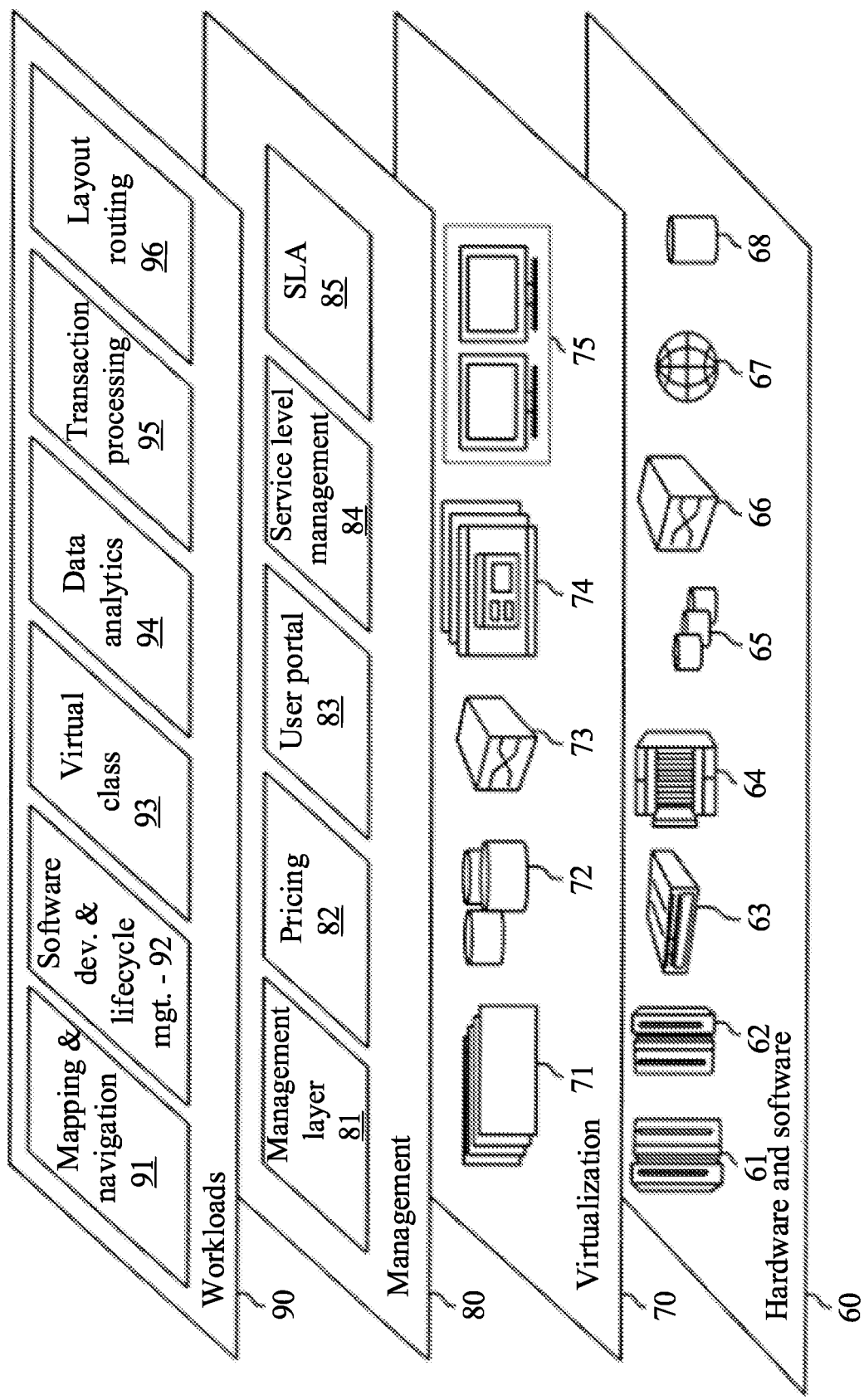
FIG. 8 is a block diagram showing a set of functional abstraction layers provided by a cloud computing environment in accordance with one embodiment.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and layout routing 96.

Having described preferred embodiments of region-based layout routing (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for routing a design layout, comprising:
    setting, an inner region and an outer region for modification of structures in an original design layout, in accordance with a minimum spacing that is based on a fabrication process; and
    performing routing of trim positions and conductive wire extents within the inner region, using a hardware processor, based on positions of shapes within the outer region, including node folding of a new constraint graph to minimize perturbations from a previous constraint graph, to generate an updated design layout that can be manufactured using the fabrication process, wherein node folding includes identifying a node position of the original design layout, based on a line end position of a modified extent, and setting a node position of a corresponding line end in the new constraint graph to equal the node position of the original design layout.

2. The method of claim 1, wherein setting the inner region and the outer region includes segmenting the original design layout into input regions, with initial values of the inner region and the outer region being se equal to a selected one of the input regions.

3. The method of claim 2, wherein setting the inner region and the outer region includes expanding coordinates of the inner region to align with adjacent tracks, based on positions of conductive lines around the selected input region.

4. The method of claim 3, wherein setting the inner region and the outer region includes further expanding coordinates of the inner region to include extents that intersect with the inner region.

5. The method of claim 4, further comprising deleting extents within the inner region after expanding the coordinates of the inner region, before performing routing.

6. The method of claim 4, wherein setting the inner region and the outer region includes expanding coordinates of the outer region to lie beyond the expanded coordinates of the inner region by a distance that is determined according to the minimum spacing.

7. The method of claim 2, wherein performing, routing includes grouping the segmented regions into a number of groups that corresponds to a number of threads available on the hardware processor, with the grouping being set according to distances of the segmented regions from one another and a predetermined reach distance parameter.

8. The method of claim 1, wherein routing has been previously performed on the original design layout, and wherein performing routing is done responsive to an engineering change order.

9. The method of claim 1, further comprising fabricating an integrated chip using the updated design layout.

10. A computer program product for routing a design layout, the computer program product comprising a computer readable storage medium having program instructions embodied therewith, the program instructions executable by a hardware processor to cause the hardware processor to:
set an inner region and an outer region for modification of structures in an original design layout, in accordance with a minimum spacing that is based on a fabrication process; and
perform routing of trim positions and conductive wire extents within the inner region, using a hardware processor, based on positions of shapes within the outer region, including node folding of a new constraint graph to minimize perturbations from a previous constraint graph, to generate an updated design layout that can be manufactured using the fabrication process, wherein node folding includes identifying a node position of the original design layout, based on a line end position of a modified extent, and setting a node position of a corresponding line end in the new constraint graph to equal the node position of the original design layout.

11. A system for routing a design layout, comprising:
a hardware processor; and
a memory, that stores an original design layout and a computer program product, which, when executed by the hardware processor, causes the hardware processor to:
set an inner region and an outer region for modification of structures in the original design layout, in accordance with a minimum spacing that is based on a fabrication process; and
performing routing of trim positions and conductive wire extents within the inner region, using a hardware processor, based on positions of shapes within the outer region, including node folding of a new constraint graph to minimize perturbations from a previous constraint graph, to generate an updated design layout that can be manufactured using the fabrication process, wherein the node folding includes identification of a node position of the original design layout, based on a line end position of a modified extent, and setting of a node position of a corresponding line end in the new constraint graph to equal the node position of the original design layout.

12. The system of claim 11, wherein the computer program product further causes the hardware processor to segment the original design layout into input regions, with initial values of the inner region and the outer region being set equal to a selected one of the input regions.

13. The system of claim 12, wherein the computer program product further causes the hardware processor to expand coordinates of the inner region to align with adjacent tracks, based on positions of conductive lines around the selected input region.

14. The system of claim 13, wherein the computer program product further causes the hardware processor to further expand coordinates of the inner region to include extents that intersect with the inner region.

15. The system of claim 14, wherein the computer program product further causes the hardware processor to delete extents within the inner region after expanding the coordinates of the inner region, before performing routing.

16. The system of claim 14, wherein the computer program product further causes the hardware processor to expand coordinates of the outer region to lie beyond the expanded coordinates of the inner region by a distance that is determined according to the minimum spacing.

17. The system of claim 12, wherein the computer program product further causes the hardware processor to group the segmented regions into a number of groups that corresponds to a number of threads available on the hardware processor, with the grouping being set according to distances of the segmented regions from one another and a predetermined reach distance parameter.

18. The system of claim 11, wherein routing has been previously performed on the original design layout, and wherein performing routing is done responsive to an engineering change order.

* * * * *